Aug. 24, 1965 E. J. SPERBER 3,202,002

ROTARY BI-DIRECTIONAL STEPPER MECHANISM

Filed Feb. 4, 1963 3 Sheets-Sheet 1

INVENTOR.
EDWARD J. SPERBER
BY
Eugene M. Whitacre
Attorney

INVENTOR.
EDWARD J. SPERBER
BY
Eugene M. Whitacre
Attorney

Aug. 24, 1965 E. J. SPERBER 3,202,002

ROTARY BI-DIRECTIONAL STEPPER MECHANISM

Filed Feb. 4, 1963 3 Sheets-Sheet 3

INVENTOR.
EDWARD J. SPERBER
BY Eugene M. Whitacre
Attorney

United States Patent Office 3,202,002
Patented Aug. 24, 1965

3,202,002

ROTARY BI-DIRECTIONAL STEPPER MECHANISM

Edward J. Sperber, Indianapolis, Ind., assignor to Radio Corporation of America, a corporation of Delaware Filed Feb. 4, 1963, Ser. No. 255,797
10 Claims. (Cl. 74—157)

The present invention relates to means for operating rotary control shafts and other rotary control elements of mechanical and electrical apparatus, such as phonograph and television apparatus, indirectly or by remote control. This generally involves some form of electric motor drive means which, in one form, may be of the solenoid-operated or ratchet motor type. Such motor means are of simplified, low-cost construction adapted for commercial use in connection with remote and indirect control systems for apparatus of the type referred to. However, they have the disadvantage in operation that the control element or shaft may be moved in but one direction.

For channel tuning control of television receivers and other step-controlled apparatus, the uni-directional solenoid-operated or ratchet motor presents no operational difficulty, and bi-directional operation is possible through the use of two oppositely-running motors in connection with the same control shaft. However, this involves added complication and cost in the apparatus involved. For necessarily-reversible rotary control shafts and other elements for volume-control, brightness-control, contrast-control and like control devices of radio and television receivers, for example, the solenoid and ratchet, or ratchet motor type has been generally considered to be impractical.

It is, therefore, an object of the present invention to provide an improved ratchet-type or stepper mechanism for operating rotary control elements of controlled mechanical and electrical apparatus, such as volume and other rotary control shafts of radio and television receivers and the like, in two directions, and yet be of simplified, unitary, low-cost construction.

It is also an object of this invention to provide an improved and simplified solenoid-operated stepper mechanism for rotary control shafts and like control elements of volume control devices, selector switches, channel selector turrets and the like, in radio, television and like electronic and electrical apparatus.

Unlike known solenoid-operated ratchet and pawl means or vibratory motor means, sometimes employed, as noted, for advancing certain rotary control elements in one direction, the rotary bi-directional stepper mechanism of the present invention provides controlled movement of such control elements in either direction selectively, and in a predetermined number of equal steps over the angular operating range thereof. The steps are sufficient in number to provide a desired fineness in the degree of control. For volume-control and like control shafts in apparatus of the character referred to, the angular operating range is generally less than a full revolution and approximately two hundred and seventy degrees (270°). A larger number of steps in any operating range provides a finer degree of control, as the angular and functional change per step is reduced.

In accordance with the invention, the stepper mechanism comprises two solenoids or solenoid magnets, which may be of the alternating-current type, an operating lever or rocker arm, and an operating ratchet wheel with its driving ratchet pawl elements.

The ratchet wheel is adapted to be connected with or attached to the rotary control shaft or element which is to be step operated, such as a volume-control shaft, for example. The ratchet wheel effectively is a double ratchet wheel or a ratchet wheel with two sections or different sets of teeth, with individual ratchet pawls for bi-directional operation, and may have the same or a different number of teeth for the same full operating range in either direction.

The operating lever or rocker arm is pivoted at or near each end to move on parallel pivot axes provided by spaced pivot pins. The rocker arm is pivotally connected through the pivot pins with the solenoid plungers, and is spring-loaded at each plunger or pivotal point to lie in a fixed position of rest, with the solenoids deenergized.

In a preferred embodiment, two pawl arms, preferably integral with the operating lever or rocker arm, are connected one with each pivoted end of the lever or arm in an effectively U-shaped structure, substantially embracing the ratchet wheel on three sides in spaced relation thereto. The ratchet pawls are provided on the pawl arms at each free outer end. The arms are thus spaced from each other in substantially parallel relation on opposite sides of the ratchet wheel and in the general plane thereof, with the pawl elements offset to face the respective toothed sertions of the wheel, and slightly spaled therefrom with with the rocker arm in the position of rest.

The rocker arm or lever pivots or tilts on the one or the other of the two different pivot axes, as the solenoids are selectively energized by operating current pulses. The rocker arm or lever thus is tilted on one pivot pin while the other pivot pin is moved by solenoid action. The rocker arm and pawls, therefore, move on one pivot pin or axis to engage and drive the ratchet wheel in one direction of rotation and move on the other pivot pin or axis to engage and drive the ratchet in the opposite direction. Control switch means are provided for selectively energizing the solenoids with operating current pulses, thereby to step the connected control element of the apparatus, such as the volume control shaft of a radio or television receiver.

In accordance with a feature of the invention when one of the solenoids is energized and one of the pawls drives the ratchet wheel, the other pawl moves into position above a tooth on the opposite side of the ratchet wheel to prevent overtravel thereof as will be explained.

The invention will, however, be further understood from the following description of certain embodiments thereof, when considered in connection with the accompanying drawings, and its scope is pointed out in the appended claims.

Figure 1:
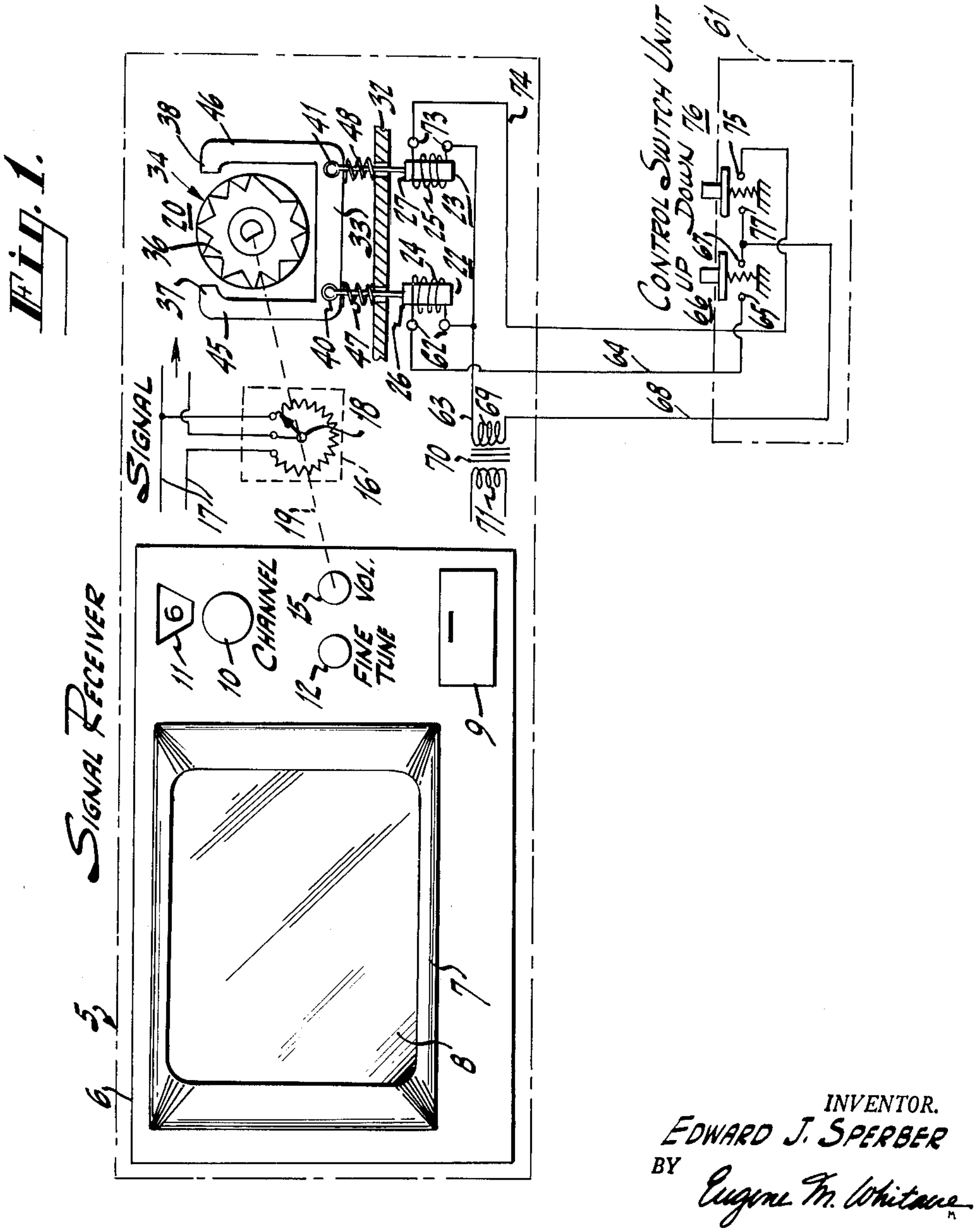
FIGURE 1 is a schematic circuit diagram, and front-view apparatus representation, of a signal receiver of the television type provided with a rotary bi-directional stepper mechanism embodying the invention.

Referring to the drawings, wherein like elements throughout the various figures are designated by like reference numerals, and referring more particularly to FIGURE 1 thereof, a signal receiver 5 of the television type is provided with a front panel 6 having a viewing window 7 for a television kinescope or picture tube 8, and a control compartment 9. By way of example, and representative of rotary control elements for apparatus of this type, the panel also includes a channel-selector knob 10 for which is provided a channel-indicator window 11, showing the receiver set or tuned for channel 6, a fine-tuning control knob 12, and a third control knob 15.

The control knob 15 is shown as being connected with a suitable control device 16 within the receiver representing any control element of the receiver for which indirect or remote bi-directional operation is desired. In the present example, the knob 15 is for volume or loudness control and the device 16 is a volume-control potentiometer connected in the usual manner in an audio-frequency signal translating circuit 17, to control the flow of audio-frequency signals therethrough and the sound output of the receiver as is understood. The volume control knob is connected with the movable arm 18 of the device 16 through a shaft indicated at 19 which extends into operating connection with a bi-directional stepper mechanism 20 in rear thereof within the receiver.

Figure 2:
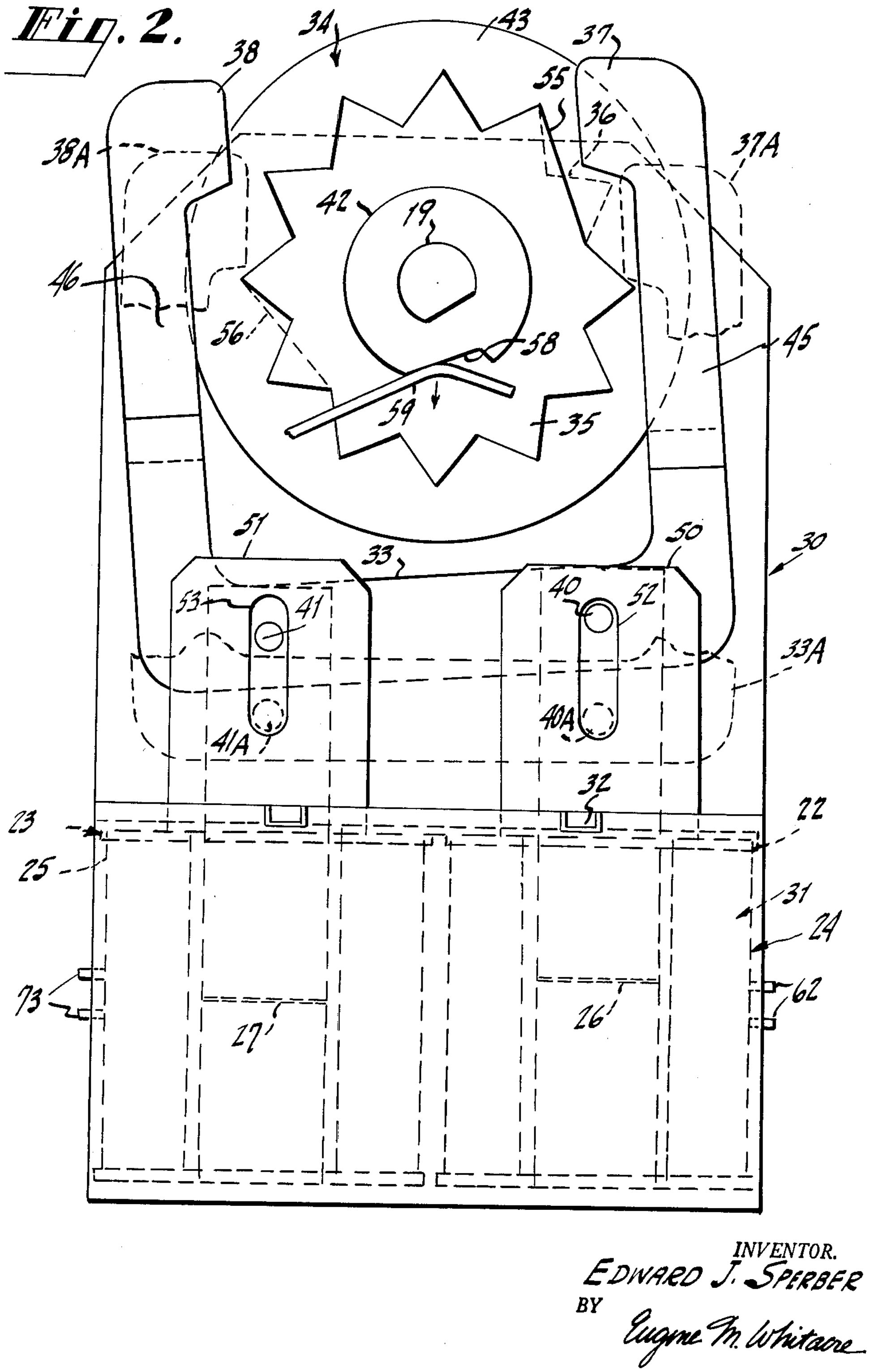
FIGURE 2 is an enlarged rear end view of the stepper mechanism of FIGURE 1, showing structural details such as may be provided for commercial use.
Figure 3:
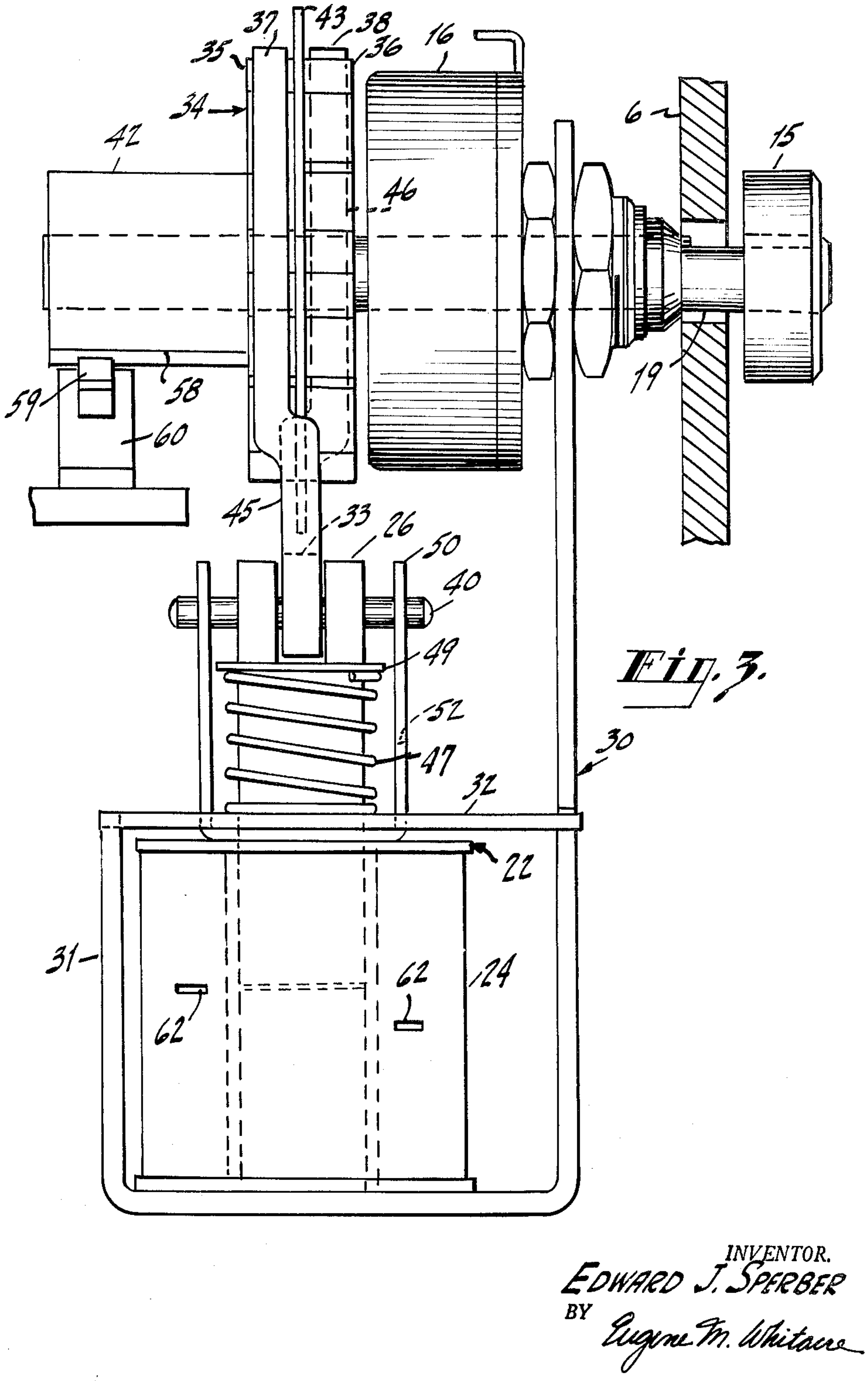
FIGURE 3 is a side-view, in elevation, of the stepper mechanism of FIGURES 1 and 2, showing further details of construction.

Referring to FIGURES 2 and 3 along with FIGURE 1, the stepper mechanism includes two alternating-current solenoids or solenoid magnets 22 and 23 comprising operating windings 24 and 25, respectively, and respective central solenoid plungers 26 and 27. The solenoids are arranged in spaced substantialy axially-parallel relation to each other in the mechanism and are held in fixed relation to each other in a suitable mounting bracket or frame 30. This may be in the form of a thin L-shaped plate having an upturned rear apron or end 31 supporting an upper floor plate 32 which extends across the frame to hold the solenoid elements in place.

The bracket or frame structure is representative of any suitable bracket or chassis means for mounting the stepper mechanism in the receiver or apparatus, and for holding the solenoid elements in spaced relation to each other with the plungers operating in substantially parallel relation, and preferably extending vertically as shown.

The stepper mechanism further comprises an elongated rocker arm or operating lever 33 and an operating ratchet wheel 34 having two sets of teeth, or two radially-toothed sections, 35 and 36, and two driving ratchet pawls or pawl elements 37 and 38 which operate therewith.

The operating lever or rocker arm 33 is pivoted at or near each end, on substantially parallel axes provided by spaced pivot pins 40 and 41, preferably of plastic material such as nylon or Teflon for quiet operation. Likewise, the two sections or different sets of radial teeth of the ratchet wheel preferably are of plastic material. As indicated in the present example, the ratchet wheel may thus be molded in one unitary piece with an extended hub element 42, and with an intermediate barrier disk 43 between the two sections. The control shaft 19 from the volume control knob 15 extends, or is extended by suitable means, through the panel 6 and both the volume-control device 16 and the ratchet wheel and hub as indicated in dotted outline.

With this construction, the volume control device may be mounted directly on the frame 30 as shown and serves to support the rotary elements of the stepper mechanism on the rear extension of the volume-control shaft 19. In any case, the ratchet wheel and the control shaft are adapted to rotate in coaxial relation, whereby the ratchet wheel may effectively drive or rotate the control shaft through the angular operating range of the volume control device 16. As noted, this device and the control shaft represent any control device and rotary control element therefor in mechanical or electrical apparatus of the type shown, adapted for indirect or remote operation by a stepping mechanism.

The rocker arm 33 is connected with each of the pawls 37 and 38 through a pair of pawl arms 45 and 46 respectively. The two pawl arms are carried by the rocker arm, one at each end thereof, in spaced substantially-parallel relation on opposite sides, and in the general plane, of the ratchet wheel 34. The pawls or pawl elements 37 and 38 are located at, and in the present example are integral with, the free outer ends of the pawl arms, and face the teeth of the ratchet wheel in slightly spaced relation thereto, with the rocker arm in the position of rest indicated in FIGURE 1.

The rocker arm and attached pawl arms form a U-shaped structure spaced from but substantially embracing the ratchet wheel on three sides. The free-ends of the pawl arms and the pawls or pawl elements are offset in different planes, as indicated more clearly in FIGURE 3, to engage the two different sets or rows of teeth on the ratchet wheel, while the lever or rocker arm tilts or pivots on the two different pivot axes represented by the pins 40 and 41. The solenoid plungers 26 and 27 operate at substantially a right angle to the longitudinal axis of the rocker arm, and in a direction away from the ratchet wheel, to move the rocker arm from the position of rest at either end.

Assuming that either of the pivot pins 40 or 41 are moved away from the position of rest as indicated in FIGURE 2 for the pin 41, the rocker arm pivots or tilts at the other end, about the opposite pivot axis, or the pivot pin 40 in this case, against spring loading. This loading retards or delays the arm movement at the latter axis sufficiently, or with sufficient force, to permit the arm to operate as a lever and normally bring the opposite pawl into engagement with the teeth of its respective ratchet wheel section. The spring loading is provided by suitable coiled springs 47 and 48 which act on the rocker arm 33 either directly or indirectly at the pivot axes or pins 40 and 41 respectively, and in connection with a suitable fixed supporting element of the mechanism which, in the present example, is the floor plate 32 of the supporting frame.

Also in the present example, and as shown in FIGURES 2 and 3, the springs 47 and 48 may surround the upper ends of the solenoid plungers between the floor plate 32 and fixed washers on the plungers, such as a fixed washer 39, as shown in FIGURE 3 for example, for the spring 47. The washers bear against the rocker arm and thus apply the loading thereto. The showing of the loading or solenoid return springs is omitted in FIGURE 2 in order to simplify the showing therein of other portions of the mechanism.

The pivot pins 40 and 41 are provided with slotted guide brackets 50 and 51, respectively, to limit the movement of the rocker arm by means of the pivot pins which move in slots 52 and 53 as indicated in FIGURE 2 for example, with the pins extending through the slots as indicated in FIGURE 3. In the present example the guide brackets 50 and 51 are U-shaped plate elements suitably attached to the upper floor plate 32 of the frame through openings therein and are held in place by the solenoid magnet elements 22 and 23. This represents any suitable means whereby the pins are guided to move in substantially axially-parallel relation in response to operation of the solenoid plungers. This movement is between a position of rest with the solenoids deenergized and a second position wherein the solenoid plungers are moved to carry the pivot pins to stop positions indicated at 40A and 41A in FIGURE 2. This movement carries the operating ratchet, such as the ratchet pawl 37, to a limit position, such as the position 37A, and the rocker arm to the position 33A in FIGURE 2, or normally through a full stepping motion represented by one tooth of the ratchet wheel. It will be noted that the pawl 38 has been moved to the position 38A above a tooth of the ratchet wheel section 36, thereby preventing overtravel of the ratchet wheel, and providing a fixed stop or limit per step of movement.

In the present example, as shown in FIGURE 2 more effectively, the ratchet wheel teeth are of the radial type having non-radial cam surfaces for meeting and moving with the reciprocating pawl elements. In each ratchet wheel section, a missing tooth is provided to bring the operating motion to a predetermined stop represented by the limit of the range of travel of the control shaft or other element. In the present example such a missing tooth is provided in connection with the ratchet wheel section 35 at a cam or clearance surface 55, and similarly in the section 36 as indicated at 56 in FIGURE 2.

In the example indicated in FIGURE 2, therefore, the ratchet wheel 34 would be advanced in a clock-wise direction to the position shown, after which the solenoid operation of the pawl 37 to the position 37A would clear or pass over the surface 55 and thus would not advance the ratchet wheel farther in the clock-wise direction. The ratchet wheel is thus at its limit of rotation in the position shown. However, the dotted-line representation of the toothed section 36 in rear of the section 35, as viewed in FIGURE 2, serves to illustrate the action which takes place when the wheel is actuated in either direction by the tilting rocker arm and connected ratchet pawls.

By way of example, further assuming that the solenoid winding 24 is energized to move the plunger 26 downwardly, as viewed in FIGURES 1 and 2, the rocker arm 33 will be retarded by the spring loading provided by the spring element 48 acting at the opposite pivot axis or pin 41, and will tilt about that pivot point to bring the associated pawl 38, connected with that end of the lever, into engagement with the ratchet wheel section 36, and thus move the ratchet wheel counter clock-wise as viewed in FIGURE 2, and clock-wise as viewed in FIGURE 1. This is in the direction to increase the volume or move the control shaft in a positive direction from the extreme low limit. As this action continues, the spring 47 is compressed by the pull of the solenoid plunger 26 while the spring 48, which caused the delay and tilting action, is also overcome as the full driving movement of the pawl comes to the limit established by the guide slot 52 for the pin 40, thus advancing the ratchet wheel one tooth or position.

In the extreme clock-wise position shown in FIGURE 2 for the driving ratchet wheel 34 and the driven control shaft 19, the hub 42 or other element of the ratchet may be provided with suitable means, such as a cam surface 58, for operating the control lever or arm 59 of an OFF-ON power switch 60. In the present example it is moved to the OFF position, and is turned to the ON position as the ratchet wheel is rotated from the position shown in FIGURE 2 in the counter clock-wise direction. This represents any suitable means for actuating the apparatus power switch in connection with a stepper mechanism embodying the invention.

The ratchet wheel in the present mechanism is provided with two sections or two different sets of preferably radial teeth having non-radial cam surfaces, as shown, for meeting and smoothly moving with the two offset driving pawl elements. It thus operates step-by-step to move the controlled rotary shaft or like element of the apparatus selectively in either direction as the one or the other of the solenoid magnets is energized with a pulse or repeated pulses of operated current, one pulse for each step of the ratchet wheel.

An ordinary ratchet wheel generally has teeth each with one side radial and the other side inclined, so that a reciprocating pawl may catch on the one side and slide on the other. Normally, such a wheel is thus moved in one direction only, such as a forward direction, but it is not bi-directional and does not reverse in operation, whereas the present mechanism provides for operating a rotary control shaft in either direction selectively over any desired angular operating range or between any desired limits.

Any suitable switch or like control means may be provided for applying operating current to the solenoid windings. In the present example an external control switch unit 61 is provided in connection with a control circuit including the windings 24 and 25. The winding 24 is provided with terminals 62, one of which is connected with a common supply lead 63 for operating current, and the other of which is connected through an extension and control lead 64 with the unit 61 and a terminal 65 of a switch element 66 therein, which may be of the push-button type indicated. The opposite terminal 67 of the switch element 66 is connected to a second extension and control lead 68 for the unit. The leads 63 and 68 are connected with the secondary winding 69 of a suitable power supply transformer 70 of the step-down type, the primary winding 71 of which may be connected to any suitable alternating-current power supply source (not shown) in the apparatus.

Likewise, the solenoid winding 25 is provided with terminals 73, one of which is connected with the common supply lead 63 and the other of which is connected through a third extension and control lead 74 with the unit and one contact 75 of a second switch element 76 therein, which may also be of the push-button type. This has a second contact 77 connected with the second supply lead 68 in the unit 61.

As will be seen from the circuit diagram portion of FIGURE 1, with the transfer 70 energized, operation of the control switch element 66 will apply operating current pulses to the solenoid winding 24 and thus drive the control shaft 19 in a clock-wise or "UP" direction as viewed in FIGURE 1. Operation of the control switch element 76 likewise will energize the solenoid winding 25 and operate the mechanism to rotate the control shaft 19 in the opposite, counter clock-wise, or "DOWN" direction. The control switch unit shown represents any suitable switch means for applying operating current pulses to the solenoid windings 24 and 25 to operate the mechanism selectively in either direction.

A rotary bi-directional stepper mechanism as shown and described, is of simplified, low-cost construction adapted for operating rotary control elements of controlled mechanical and electrical apparatus, such as volume and other rotary control shafts of radio and television receivers and the like, selectively and to any degree in two directions, and with predetermined stop positions in the range of movement.

What is claimed is:

1. A bi-directional stepper mechanism for rotating a control shaft comprising:

a ratchet wheel adapted for attachment to said shaft and having two radially toothed sections adapted for driving said shaft in opposite directions, means providing a driving pawl for each section of said ratchet wheel, a rocker arm connected with said driving pawls and pivoted for movement on parallel spaced axes from a rest position, means for moving the rocker arm and pawls on one pivot axis to engage and drive the ratchet wheel in one direction of rotation, and means for moving the rocker arm and pawls on the other pivot axis to engage and drive the rachet wheel in the other direction of rotation, thereby to operate said control shaft in steps progressively in either direction.

2. A bi-directional stepper mechanism for rotating a control shaft in an angular range comprising:

a ratchet wheel adapted for attachment to said shaft and having two radially-toothed sections adapted for driving said shaft in opposite directions within said range, means providing a driving pawl for each section of said ratchet wheel, a rocker arm connected with said driving pawls and pivoted for movement on parallel spaced axes from a rest position, spring means connected with said rocker arm through each pivot axis for resiliently holding said arm in a position of rest with the pawls disengaged from said wheel, a solenoid magnet having a plunger connected for moving the rocker arm and pawls on one pivot axis to engage and drive the ratchet wheel in one direction of rotation, a second solenoid magnet having a plunger connected for moving the rocker arm and pawls on the other pivot axis to engage and drive the ratchet wheel in the other direction of rotation, and means for selectively energizing said solenoid magnets with operating current pulses, thereby to operate said control shaft in steps progressively in either direction.

3. A bi-directional stepper mechanism for operating rotary control shafts and like rotary control elements of mechanical and electrical apparatus comprising:

a ratchet wheel rotatable in driving connection with one of said elements, said ratchet wheel having two radially-toothed sections and a driving pawl for each section adapted for driving said element in opposite directions, a pair of spaced supporting arms for said pawls, an elongated rocker arm connected at its ends with said arms and the driving pawls and pivoted for movement on parallel spaced axes from a rest position, and push-button control means connected for selectively moving the rocker arm and pawls on one pivot axis to engage and drive the ratchet wheel in one direction of rotation and on the other pivot axis to engage and drive the ratchet wheel in the other direction of rotation, thereby to operate said control element in steps progressively in either direction.

4. A rotary bi-directional stepping mechanism for operating rotary control elements of mechanical and electrical apparatus in either direction selectively and in a predetermined number of steps over the angular range thereof, comprising in combination:

two solenoid magnets each comprising an operating winding and a solenoid plunger, an elongated operating lever pivotally connected adjacent its ends with the solenoid plungers on two spaced substantially parallel pivot axes, an operating ratchet wheel adapted to be connected with and drive a rotary control element of said apparatus, said ratchet wheel having two sets of radial teeth and two driving ratchet-pawl elements therefor connected with the ends of said operating lever and positioned for engaging said teeth, and means for selectively energizing said solenoid magnets with operating current pulses, thereby to move the operating lever and pawls on said pivot axes to selectively engage and drive the ratchet wheel and said control element in steps progressively in either direction of rotation.

5. A rotary bi-directional stepping mechanism as defined in claim 4, wherein the pivot axes for the operating lever are provided by pivot pins of plastic material with a fixed guide bracket having guide slots for directing and limiting the movement of each pin, and wherein each set of the ratchet wheel teeth is provided with a blank tooth at different angular positions for limiting the movement range of said ratchet wheel and connected control element in both directions.

6. A rotary bi-directional stepping mechanism for operating rotary control elements of mechanical and electrical apparatus in either direction selectively and in a predetermined number of steps over the angular range thereof, comprising in combination:

two solenoid magnets each comprising an operating winding and a solenoid plunger, said magnets being mounted in spaced substantially parallel relation, an operating lever extending between said solenoid magnets and pivotally connected adjacent its ends with the solenoid plungers, an elongated pivot pin in each of said pivot connections, means for spring loading said operating lever through said pivot connections to lie in a fixed position of rest with the solenoids deenergized, fixed bracket means having guide slots for each pivot pin, an operating ratchet wheel adapted to be connected with a rotary control element of said apparatus, said ratchet wheel having two sets of radial teeth and two driving ratchet-pawl elements therefor connected with the ends of said operating lever and positioned for engaging said teeth, and push-button means for selectively energizing said solenoid magnets with operating current pulses, thereby to move the operating lever and pawls on one or the other of said pivot axes and engage and drive the ratchet wheel and said control element selectively in either direction of rotation.

7. A rotary bi-directional stepping mechanism for operating rotary control elements of mechanical and electrical apparatus in either direction selectively and in a predetermined number of steps over the angular range thereof, comprising in combination:

two solenoid magnets in spaced axially-parallel relation, said magnets each comprising an operating winding and an axially-movable plunger therein, an elongated rocker arm extending between and pivotally connected with the adjacent ends of the solenoid plungers, said pivotal connections being provided by two spaced substantially-parallel pivot pins of plastic material, individual fixed bracket means for guiding and limiting the movement of said pivot pins, an operating ratchet wheel adapted to be connected with and drive a rotary control element of said apparatus, said ratchet wheel having two rows of ratchet teeth, means providing two driving ratchet-pawl elements for said wheel, means including two spaced arm elements connected with the ends of said operating lever for holding said pawl elements positioned in spaced offset relation for engaging said ratchet teeth, and push-button control means for selectively energizing said solenoid magnets with operating current pulses, thereby to move the operating lever and pawls on said pivot pins to selectively engage and drive the ratchet wheel and said control element in steps progressively in either direction of rotation.

8. In a controlled apparatus, the combination with a rotary control shaft therefor, of a bi-directional stepper mechanism for said shaft comprising:

a ratchet wheel mounted on said shaft and having two side-by-side radially-toothed sections each with one missing tooth at different angular stop positions, a ratchet pawl for engaging each section and driving said shaft in opposite directions, a pair of spaced pawl arms extending along diametrically opposite sides of said ratchet wheel for holding said ratchet pawls in operative relation to said toothed sections, a rocker arm connected with said driving pawls through said pawl arms and pivoted for tilting movement with the arms in the general plane of the ratchet wheel on parallel spaced axes extending therethrough normal to said plane, said rocker arm and connected pawl arms providing a U-shaped structure effectively embracing three sides of the ratchet wheel and spaced therefrom, means providing spring loading for resiliently restraining said rocker arm against movement from a rest position, means including a solenoid magnet connected for moving the rocker arm and pawls on one pivot axis to engage and drive the ratchet in one direction of rotation, means including a second solenoid magnet connected for moving the rocker arm and pawls on the other pivot axis to engage and drive the ratchet wheel in the other direction of rotation, and control switch means for selectively energizing said solenoid magnets with operating current pulses, thereby to operate said control shaft in predetermined steps progressively in either direction.

9. In a signal-translating apparatus, the combination with a rotary control shaft therefor, of a bi-directional stepper mechanism for said shaft comprising:

a ratchet wheel attached coaxially to said shaft and having two parallel side-by-side radially-toothed sections, means providing a driving pawl for each section of said wheel adapted for driving said shaft in opposite direction, a rocker arm connected with said driving pawls in a U-shaped structure including two spaced pawl arms at opposite ends thereof, said rocker arm being pivoted for movement in the general plane of the ratchet wheel on two substantially parallel spaced pivot pins, means providing spring loading at said pivot pins for resiliently restraining said arm against movement from a fixed position of rest, means including a solenoid magnet connected for tilting said rocker arm in one direction and moving said pawls on one pivot pin to engage and drive the ratchet wheel in one direction of rotation, means including a second solenoid magnet connected for tilting the rocker arm in an opposite direction and moving said pawls on the other pivot pin to engage and drive the ratchet wheel in the other direction of rotation, and means for selectively energizing said solenoid magnets with operating current pulses, thereby to operate said control shaft in predetermined steps progressively in either direction.

10. In a single translating apparatus having a rotary control element operable over a predetermined angular range, a rotary bi-directional stepping mechanism for operating said control element in either direction selectively and in a predetermined number of steps over said range, comprising in combination:

a mounting frame element, two solenoid magnets mounted in said frame element and each comprising an operating winding and a solenoid plunger, said plungers being aligned in spaced substantially parallel relation, an elongated rocker arm pivotally connected adjacent its ends with the solenoid plungers, a pivot pin in each of said connections, a fixed guide bracket for each pin mounted on the frame element and having aligned guide slots for the pin, an operating ratchet wheel adapted to be connected with and drive said rotary control element of the apparatus, said ratchet wheel having two sets of radial teeth of plastic material and individual driving ratchet-pawl elements therefor, a pair of spaced pawl arms connected with the end of said rocker arm and supporting said pawl elements in offset position for engaging said ratchet wheel teeth, spring means connected with the rocker arm through each pivot pin for resiliently holding said arm in a position of rest with the pawls disengaged from the ratchet wheel, and means for selectively energizing said solenoid magnets with operating current pulses, thereby to move the operating level and pawls on said pivot axes to selectively engage and drive the ratchet wheel and said control element in steps progressively in either direction of rotation.

References Cited by the Examiner

UNITED STATES PATENTS

| | | | |
|---|---|---|---|
| 1,704,904 | 3/29 | Schaub. | |
| 1,968,973 | 8/34 | Thompson | 310—22 |
| 2,377,583 | 6/45 | Smith | 74—157 X |
| 2,477,599 | 8/49 | Hammonn | 74—157 X |
| 2,694,805 | 11/54 | Jordan | 74—157 X |
| 2,993,383 | 7/61 | Ardner | 74—157 X |
| 3,124,967 | 3/64 | Kull | 74—157 |

FOREIGN PATENTS

| | | |
|---|---|---|
| 338,173 | 12/55 | Switzerland. |

BROUGHTON G. DURHAM, *Primary Examiner.*

MILTON O. HIRSHFIELD, *Examiner.*

UNITED STATES PATENT OFFICE
CERTIFICATE OF CORRECTION

Patent No. 3,202,002

August 24, 1965

Edward J. Sperber

It is hereby certified that error appears in the above numbered patent requiring correction and that the said Letters Patent should read as corrected below.

Column 2, line 27, strike out "with"; column 9, line 8, after "ratchet" insert -- wheel --.

Signed and sealed this 5th day of April 1966.

(SEAL)
Attest:

ERNEST W. SWIDER
Attesting Officer

EDWARD J. BRENNER
Commissioner of Patents